United States Patent
Kiran et al.

(10) Patent No.: US 10,416,923 B1
(45) Date of Patent: Sep. 17, 2019

(54) FAST BACKUP SOLUTION FOR CLUSTER SHARED VOLUMES SHARED ACROSS A CLUSTER OF NODES USING EXTENT SETS AS PARALLEL SAVE STREAMS

(71) Applicant: EMC IP Holding Company LLC, Hopkinton, MA (US)

(72) Inventors: Mv Kiran, Bangalore (IN); Manjunath Jagannatha, Bangalore (IN); Ravi Shankar Panem, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 68 days.

(21) Appl. No.: 15/721,440

(22) Filed: Sep. 29, 2017

(51) Int. Cl.
   *G06F 12/00* (2006.01)
   *G06F 3/06* (2006.01)
   *G06F 11/20* (2006.01)

(52) U.S. Cl.
   CPC .............. *G06F 3/065* (2013.01); *G06F 3/067* (2013.01); *G06F 3/0611* (2013.01); *G06F 3/0619* (2013.01); *G06F 11/2069* (2013.01); *G06F 2201/805* (2013.01); *G06F 2201/82* (2013.01)

(58) Field of Classification Search
   CPC ........ G06F 3/065; G06F 3/067; G06F 3/0611; G06F 3/0619; G06F 2201/805; G06F 11/2069; G06F 2201/82
   USPC ...................................... 711/162, 6; 709/201
   See application file for complete search history.

(56) References Cited

U.S. PATENT DOCUMENTS

| | | | | |
|---|---|---|---|---|
| 6,938,135 B1* | 8/2005 | Kekre | ................ | G06F 11/1451 711/161 |
| 7,895,501 B2* | 2/2011 | Brown | ................ | G06F 11/1004 714/758 |
| 10,114,705 B1* | 10/2018 | Kumar | ................ | G06F 11/1469 |
| 2005/0138306 A1* | 6/2005 | Panchbudhe | ....... | G06F 11/2094 711/162 |
| 2014/0215149 A1* | 7/2014 | Sampathkumar | ..... | G06F 3/0689 711/114 |
| 2015/0347046 A1* | 12/2015 | Wang | .................... | G06F 3/0619 711/162 |
| 2018/0121116 A1* | 5/2018 | Wang | .................... | G06F 3/0619 |
| 2018/0232165 A1* | 8/2018 | Kusters | ................ | G06F 3/0619 |

* cited by examiner

*Primary Examiner* — Hong C Kim
(74) *Attorney, Agent, or Firm* — Womble Bond Dickinson (US) LLP

(57) ABSTRACT

One embodiment is related to a method for backing up a shared volume using parallel save streams, comprising: taking a snapshot of the shared storage volume that is shared across a plurality of nodes; identifying used blocks on the shared storage volume based on the snapshot; organizing logically the used blocks into extent sets, wherein a number of extent sets is equal to a number of the plurality of nodes; assigning the extent sets to the plurality of nodes, wherein each of the plurality of nodes is assigned one extent set; and streaming, by each of the plurality of nodes, a respective extent set to a backup apparatus, wherein the plurality of nodes stream the extent sets in parallel.

21 Claims, 5 Drawing Sheets

FAST BACKUP SOLUTION FOR CLUSTER SHARED VOLUMES SHARED ACROSS A CLUSTER OF NODES USING EXTENT SETS AS PARALLEL SAVE STREAMS

FIELD OF THE INVENTION

Embodiments of the disclosure are related to electronic devices, and more particularly, to a method, apparatus, and system for backing up a shared storage volume using parallel save streams.

BACKGROUND

A Cluster Shared Volume (CSV) is a storage volume that is made accessible for read and write operations by all nodes within a failover cluster. CSVs are extensively used in production environments in hypervisor (e.g., Microsoft Hyper-V) cluster deployments. Since CSVs receive writes from multiple nodes, it is difficult to design conventional block based backup solutions involving both full and incremental backups for them because the writes need to be tracked at multiple locations and these changes need to be collated in the case of incremental backups. Hence, full backs are usually required for CSVs, which result in longer backup windows.

A backup window is the time required to perform and finish a backup, which is directly related to the backup process itself. Typically, depending on the size of data to be backed up, down time (sometimes in the hours) has to be identified in a business process. Backups, being a necessary activity, would lead to definite shrink in productive hours. The snapshot capability at various levels, such as at the volume level or the application level, may reduce down time by enabling backups even during production. But still there is a continuous endeavor to swiftly perform backups of large data sets (ranging in terabytes "TBs" or even more). Further, it has been observed that with conventional backup technologies data is typically sent in a single stream, which would result in under usage of network capabilities.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention are related to a method for backing up a shared volume using parallel save streams, comprising: taking a snapshot of the shared storage volume that is shared across a plurality of nodes; identifying used blocks on the shared storage volume based on the snapshot; organizing logically the used blocks into extent sets, wherein a number of extent sets is equal to a number of the plurality of nodes; assigning the extent sets to the plurality of nodes, wherein each of the plurality of nodes is assigned one extent set; and streaming, by each of the plurality of nodes, a respective extent set to a backup apparatus, wherein the plurality of nodes stream the extent sets in parallel.

Figure 1:
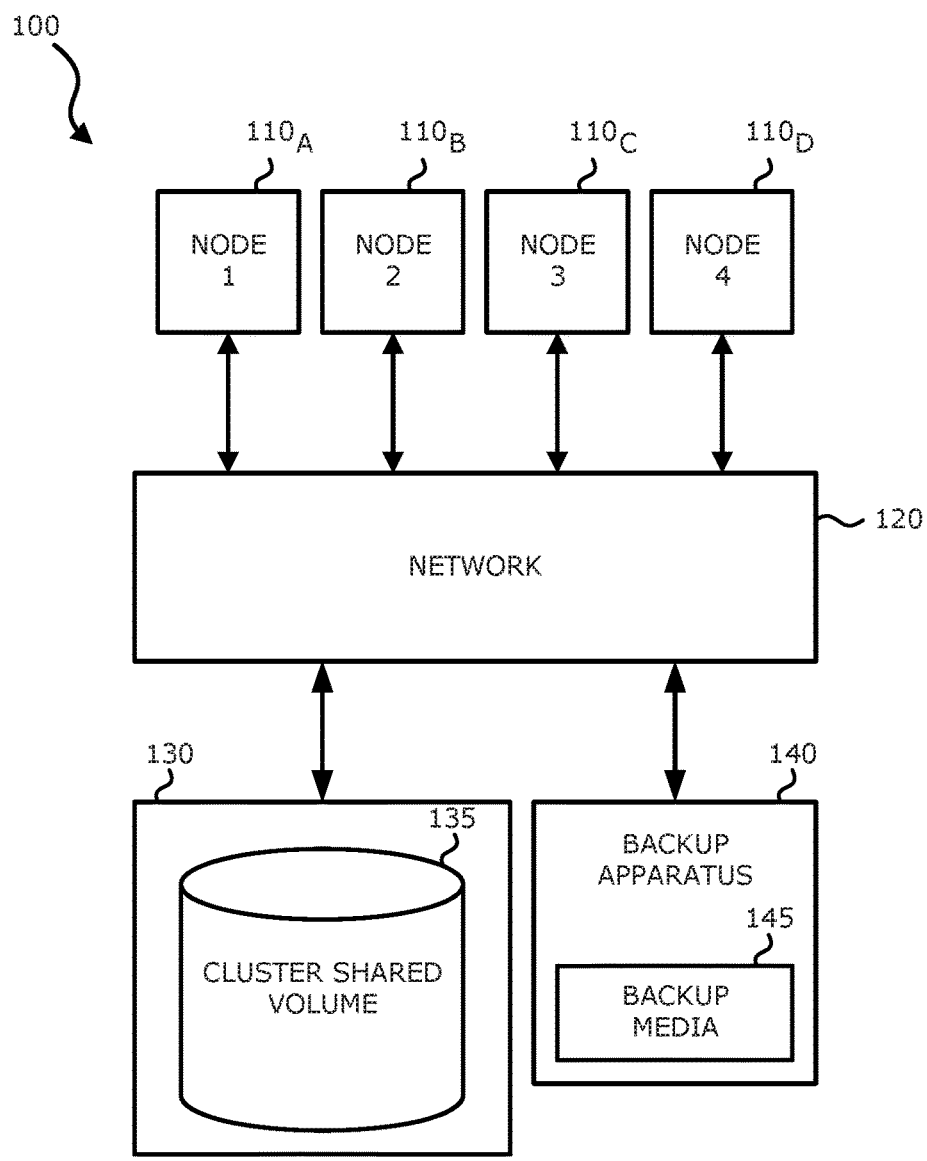
FIG. 1 is a block diagram illustrating an example environment in which embodiments of the invention may be practiced.

Referring to FIG. 1, a block diagram illustrating an example environment 100 in which embodiments of the invention may be practiced is shown. The environment 100 may comprise four nodes 110: Node 1 110A through Node 4 110D. In one embodiment, nodes 110 may form a failover cluster. Furthermore, the failover cluster may be a hypervisor cluster. Nodes 110 have access to a network 120, through which they may have access to an apparatus 130 hosting a CSV 135. In other words, the CSV 135 is a shared storage space for the nodes 110, and each of the nodes 110 has read/write access to the CSV 135.

It should be appreciated that although four similarly situated nodes 110 are illustrated in FIG. 1, the environment 100 may comprise any number of two or more nodes 110. In other words, the invention is not limited by the number of nodes 110 present.

The environment 100 may further comprise a backup apparatus (e.g., a backup system such as a Dell EMC Data Domain system) 140 hosting backup media 145, where the backup apparatus 140 is also connected to the network 120. Regular backups of the CSV 135 to the backup media 145 may be desirable so as to protect against inadvertent data losses at the CSV 135.

A known technique named block based backup greatly improves backup time over a file level backup. Details regarding the block based backup technique can be found in Balasubramanian et al., U.S. Pat. No. 8,738,870, issued May 27, 2014, incorporated herein by reference, and Balasubramanian et al., U.S. Pat. No. 8,898,407, issued Nov. 25, 2014, incorporated herein by reference. However, even with block based backup, data is streamed sequentially, resulting in poor utilization of network resources.

Figure 2:
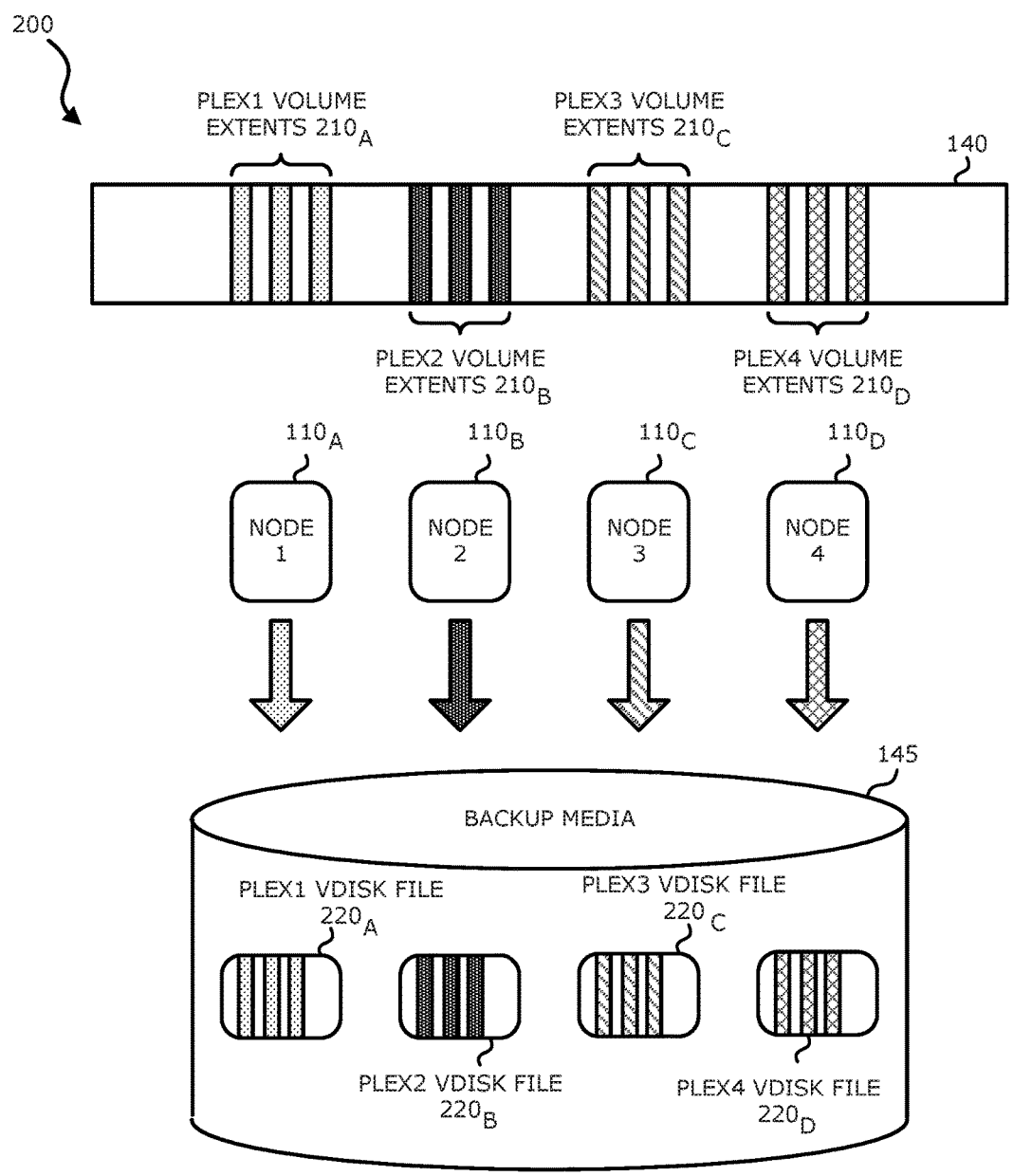
FIG. 2 is a block diagram illustrating an example method for backing up a CSV using parallel save streams, according to one embodiment of the invention.

Referring to FIG. 2, a block diagram illustrating an example method 200 for backing up a CSV using parallel save streams, according to one embodiment of the invention, is shown. The backup may be coordinated between nodes 110 or may be directed through another apparatus (not shown) that is connected to the network 120 and therefore is capable of communicating with nodes 110. In one embodiment, the backup may be initiated on any of the nodes 110 where the CSV 135 is locally mounted. A snapshot (e.g., a Volume Shadow Copy Service "VSS" snapshot) may be taken on the CSV 135. Based on the snapshot, used blocks (i.e., blocks with data) on the CSV 135 may be identified. The used blocks may be logically organized into equally sized extent sets 210, where the number of extent sets is equal to the number of nodes 110. The extent sets 210 may be assigned to nodes 110, where each node 110 is assigned one extent set 210 and is provided with its respective extent list (i.e., the list of used blocks contained in the extent set).

Relevant data relating to the CSV 135 including file headers (e.g., Hyper-V Virtual Hard Disk "VHDX" file headers), metadata information, and parent linkage is streamed to the backup media 145. Each node 110, separately, streams the extent set (i.e., plex) assigned to it to the backup media 145, where the plex is saved as a virtual disk image file 220. Therefore, the extent sets are streamed from the CSV 135 to the backup media 145 by the nodes 110 in parallel. In particular, each node 110 with the exception of the last node shares the stream location of its plex with the next node, and each node 110 with the exception of the first node receives the stream location of the plex corresponding to the previous node from the previous node and embeds the stream location of the plex corresponding to the previous node within the Parent Locator Entry (PLE) (PLE is a metadata entry of the differencing virtual disk file, and is used to identify the parent of a given differencing virtual disk file) of its own plex. Therefore, the differencing virtual disk image files 220 saved on the backup media 145 by the nodes 110 form a chain, and, when mounted, represent a full backup of the CSV 135. In one embodiment, the differencing virtual disk image files 220 may be merged to create a single disk image. This may take place in a deduplicated storage system (e.g., a Dell EMC Data Domain system).

Figure 3:
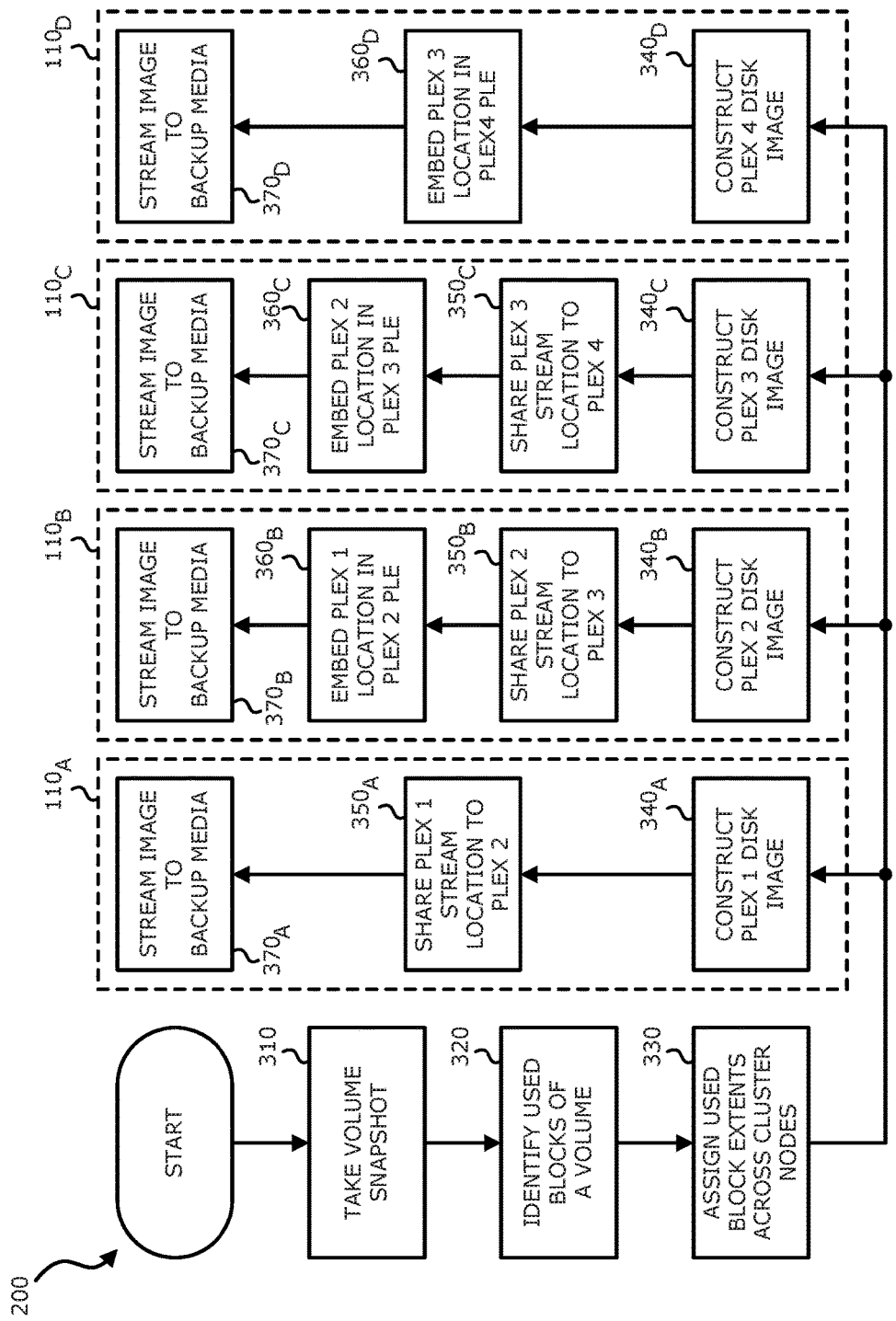
FIG. 3 is a flowchart illustrating an example method for backing up a CSV using parallel save streams, according to one embodiment of the invention.

Referring further to FIG. 3, a flowchart illustrating an example method 200 for backing up a CSV using parallel save streams, according to one embodiment of the invention, is shown. At block 310, a snapshot of the CSV 135 may be taken. At block 320, used blocks of the CSV 135 may be identified. At block 330, used blocks may be organized into extent sets 210 and assigned to nodes 110, where each node 110 is assigned one extent set 210. Thereafter, at blocks 340, in parallel, each of the nodes 110 may construct its respective plex image based on the extent set 210 that has been assigned to it. Further, at blocks 350 and 360, each node 110 with the exception of the last node shares the stream location of its plex with the next node, and each node 110 with the exception of the first node receives the stream location of the plex corresponding to the previous node from the previous node and embeds the stream location of the plex corresponding to the previous node within the PLE of its own plex. At block 370, in parallel, each of the nodes 110 may stream its respective plex image to the backup media 145, where the plex image is saved as a virtual disk image file 220.

It should be appreciated that although four nodes 110 are illustrated in FIGS. 2 and 3, the invention is not limited by the number of nodes 110 present, as long as there are two or more nodes 110.

Figure 4:
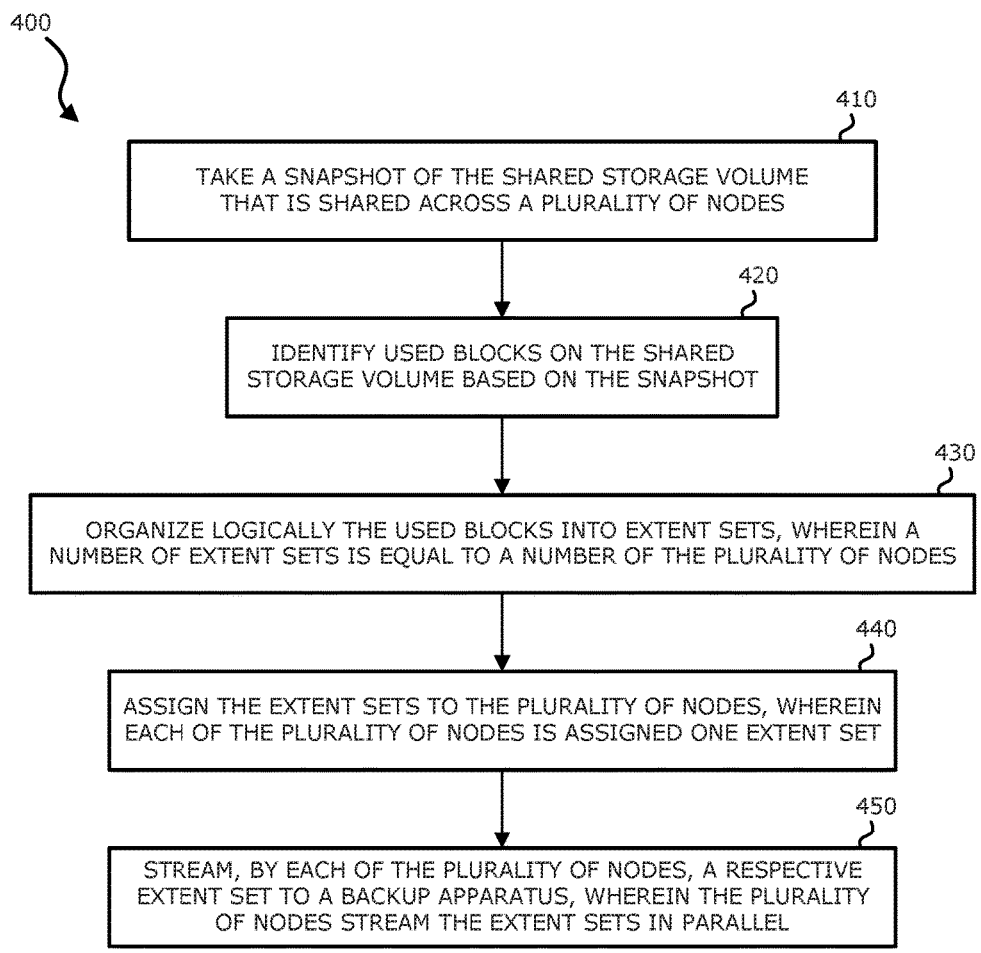
FIG. 4 is a flowchart illustrating an example method for backing up a shared volume using parallel save streams, according to one embodiment of the invention.

Referring to FIG. 4, a flowchart illustrating an example method 400 for backing up a shared volume using parallel save streams, according to one embodiment of the invention, is shown. At block 410, a snapshot may be taken of the shared storage volume that is shared across a plurality of nodes. The plurality of nodes may form a failover cluster, and the shared storage volume may be a Cluster Shared Volume. At block 420, used blocks on the shared storage volume may be identified based on the snapshot. At block 430, the used blocks on the storage volume may be logically organized into extent sets, wherein a number of extent sets is equal to a number of the plurality of nodes. The extent sets may be equally sized. At block 440, the extent sets may be assigned to the plurality of nodes, wherein each of the plurality of nodes is assigned one extent set. At block 450, each of the plurality of nodes may stream its respective extent set to a backup apparatus, wherein the plurality of nodes stream the extent sets in parallel. The extent sets may be saved on the backup apparatus as differencing disk images. Further, each node except for a last node shares a stream location of its extent set with a next node, and each node except for a first node receives the stream location of the extent set corresponding to a previous node from the previous node, and embeds the stream location of the extent set corresponding to the previous node within a PLE of its own streamed extent set. Moreover, the differencing disk images may be merged into a single disk image. The backup apparatus may be a deduplicated backup system.

Methods 200, 400 may be performed by processing logic that includes hardware (e.g. circuitry, dedicated logic, etc.), software (e.g., embodied on a non-transitory computer readable medium), or a combination thereof. For example, methods 200, 400 may be performed by processors 1501 of FIG. 5. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the invention are related to backing up data of a shared volume to a backup apparatus using a plurality of nodes and parallel save streams. A significant improvement of the back up speed may be achieved, especially with a large CSV in a cluster deployment. The computer and network resources may be more effectively utilized for the backup task, reducing the backup window. The techniques described herein may be utilized with any type of backup apparatus, e.g., EMC Dell Data Domain, Advanced File Type Devices, etc.

Figure 5:
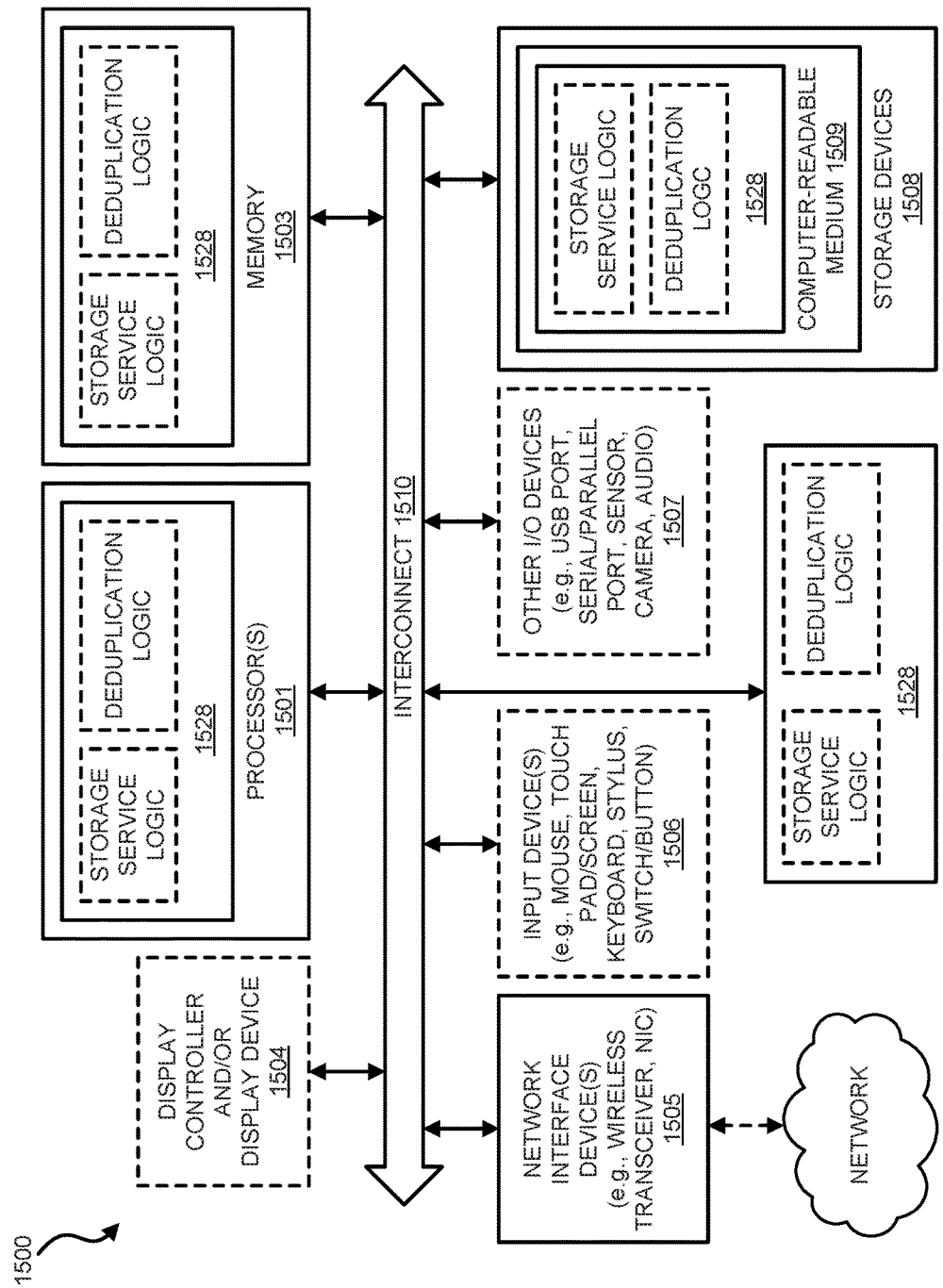
FIG. 5 is a block diagram illustrating an example of a data processing system which may be used with one embodiment of the disclosure.

FIG. 5 is a block diagram illustrating an example of a data processing system 1500 which may be used with one embodiment of the disclosure. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor

1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for backing up a shared volume using parallel save streams, comprising:
    taking a snapshot of the shared storage volume that is shared across a plurality of nodes;
    identifying used blocks on the shared storage volume based on the snapshot;
    organizing logically the used blocks into extent sets, wherein a number of the extent sets is equal to a number of the plurality of nodes;
    assigning the extent sets to the plurality of nodes, wherein each of the plurality of nodes is assigned one extent set; and
    streaming, by each of the plurality of nodes, a respective extent set to a backup apparatus, wherein the plurality of nodes stream the extent sets in parallel.

2. The method of claim 1, wherein the plurality of nodes form a failover cluster, and the shared storage volume is a Cluster Shared Volume.

3. The method of claim 1, wherein the extent sets are equally sized.

4. The method of claim 1, wherein the extent sets are saved on the backup apparatus as differencing disk images.

5. The method of claim 4, wherein each node except for a last node shares a stream location of its extent set with a next node, and each node except for a first node receives the stream location of the extent set corresponding to a previous node from the previous node, and embeds the stream location of the extent set corresponding to the previous node within a Parent Locator Entry (PLE) of its own streamed extent set.

6. The method of claim 4, further comprising merging the differencing disk images into a single disk image.

7. The method of claim 1, wherein the backup apparatus is a deduplicated backup system.

8. A non-transitory machine-readable medium having instructions stored therein which, when executed by a processor, cause the processor to perform backup operations, the operations comprising:
    taking a snapshot of a shared storage volume that is shared across a plurality of nodes;
    identifying used blocks on the shared storage volume based on the snapshot;

organizing logically the used blocks into extent sets, wherein a number of the extent sets is equal to a number of the plurality of nodes;

assigning the extent sets to the plurality of nodes, wherein each of the plurality of nodes is assigned one extent set; and streaming, by each of the plurality of nodes, a respective extent set to a backup apparatus, wherein the plurality of nodes stream the extent sets in parallel.

9. The non-transitory machine-readable medium of claim 8, wherein the plurality of nodes form a failover cluster, and the shared storage volume is a Cluster Shared Volume.

10. The non-transitory machine-readable medium of claim 8, wherein the extent sets are equally sized.

11. The non-transitory machine-readable medium of claim 8, wherein the extent sets are saved on the backup apparatus as differencing disk images.

12. The non-transitory machine-readable medium of claim 11, wherein each node except for a last node shares a stream location of its extent set with a next node, and each node except for a first node receives the stream location of the extent set corresponding to a previous node from the previous node, and embeds the stream location of the extent set corresponding to the previous node within a Parent Locator Entry (PLE) of its own streamed extent set.

13. The non-transitory machine-readable medium of claim 11, the operations further comprising merging the differencing disk images into a single disk image.

14. The non-transitory machine-readable medium of claim 8, wherein the backup apparatus is a deduplicated backup system.

15. A data processing system, comprising:
a processor; and
a memory coupled to the processor storing instructions which, when executed by the processor, cause the processor to perform backup operations, the operations including:

taking a snapshot of a shared storage volume that is shared across a plurality of nodes;

identifying used blocks on the shared storage volume based on the snapshot;

organizing logically the used blocks into extent sets, wherein a number of the extent sets is equal to a number of the plurality of nodes;

assigning the extent sets to the plurality of nodes, wherein each of the plurality of nodes is assigned one extent set; and streaming, by each of the plurality of nodes, a respective extent set to a backup apparatus, wherein the plurality of nodes stream the extent sets in parallel.

16. The data processing system of claim 15, wherein the plurality of nodes form a failover cluster, and the shared storage volume is a Cluster Shared Volume.

17. The data processing system of claim 15, wherein the extent sets are equally sized.

18. The data processing system of claim 15, wherein the extent sets are saved on the backup apparatus as differencing disk images.

19. The data processing system of claim 18, wherein each node except for a last node shares a stream location of its extent set with a next node, and each node except for a first node receives the stream location of the extent set corresponding to a previous node from the previous node, and embeds the stream location of the extent set corresponding to the previous node within a Parent Locator Entry (PLE) of its own streamed extent set.

20. The data processing system of claim 18, the operations further comprising merging the differencing disk images into a single disk image.

21. The data processing system of claim 15, wherein the backup apparatus is a deduplicated backup system.

* * * * *